May 10, 1949.　　　W. BAGGE ET AL　　　2,469,541
GAUGING INSTRUMENT FOR VEHICLE WHEELS

Filed July 6, 1946　　　3 Sheets-Sheet 1

INVENTORS
WALTER BAGGE
BY GEORGE F. BAGGE

Frederick Diehl
ATTORNEY

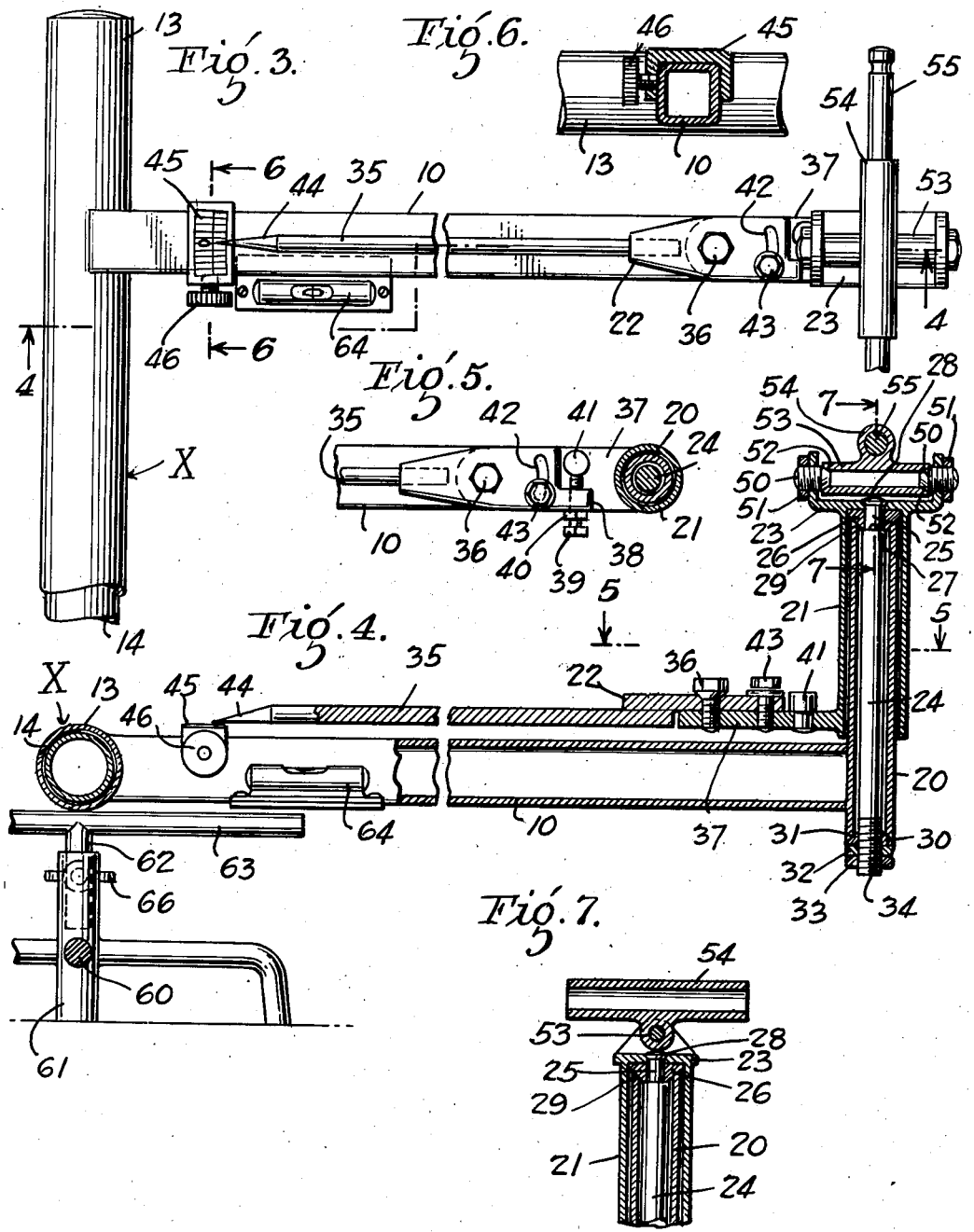

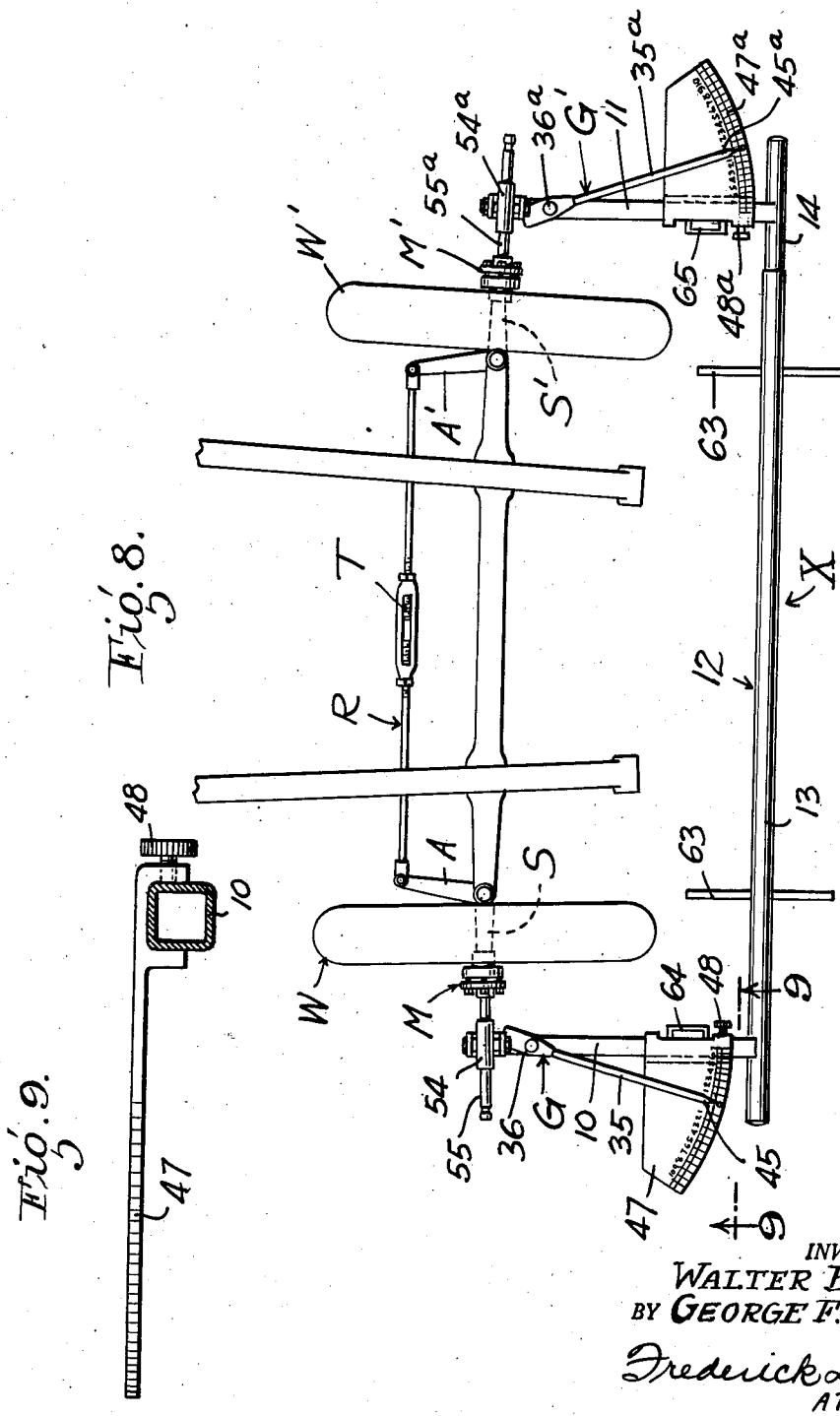

Patented May 10, 1949

2,469,541

UNITED STATES PATENT OFFICE 2,469,541

GAUGING INSTRUMENT FOR VEHICLE WHEELS

Walter Bagge and George F. Bagge, Los Angeles, Calif.

Application July 6, 1946, Serial No. 681,680

8 Claims. (Cl. 33—203.17)

This invention relates to gaging instruments of the general character embodied in the United States Letters Patent of Walter Bagge, No. 1,922,344, issued August 15, 1933, wherein is disclosed and claimed an instrument which indicates the toe-in and turning radius of the front or steering wheels of a vehicle in such manner that should the toeing positions of the wheels and the movements thereof in executing turns, not be in accordance with precalculated settings required to insure easy steering and prevent excessive tire wear, the instrument will indicate the correction required to restore the wheels to the precalculated settings. The instrument of the patent above identified, also enables various misalinements of the vehicle's chassis, such as bent axles or axle housings, shifting of the positions of the axles with respect to the frame, as well as a deformed condition of the frame, to be readily detected, thus greatly extending the range of usefulness of the instrument.

An object of the present invention is to provide a gaging instrument for vehicle wheels in which the advantages and uses of the above described patented instrument are inherent, and which, in addition, is characterized by a simplified, compact and rugged structure performing all the functions of the patented instrument, and capable of being manufactured at less cost, all to the end of placing the instrument in a price class enabling its purchase by the largest number of commercial users.

It is another object of the present invention to provide a gaging instrument for vehicle wheels, whose adjustments in setting up for a gaging operation and in the manipulation of the instrument for gaging the toe-in or turning radius of the wheels, can be accomplished with the utmost ease and dispatch, so as to materially simplify and facilitate the use of the instrument.

With these and other objects in view, the invention resides in the combinations, arrangements and functional relationships of elements as set forth in the following specification and particularly pointed out in the appended claims.

In the accompanying drawings,

Figure 3 is an enlarged fragmentary plan view of a portion of the instrument shown in the preceding figures;

Figure 4 is a vertical sectional view taken on the line 4—4 of Figure 3;

Figure 5 is a fragmentary plan view in section, taken on the line 5—5 of Figure 4;

Figure 6 is a fragmentary vertical sectional view taken on the line 6—6 of Figure 3;

Figure 7 is a fragmentary vertical sectional view taken on the line 7—7 of Figure 4;

Figure 8 is a view similar to Figure 1, and showing the use of the gaging instrument in determining the turning radius of the wheels; and Figure 9 is an enlarged fragmentary vertical sectional view taken on the line 9—9 of Figure 8.

Figure 1:
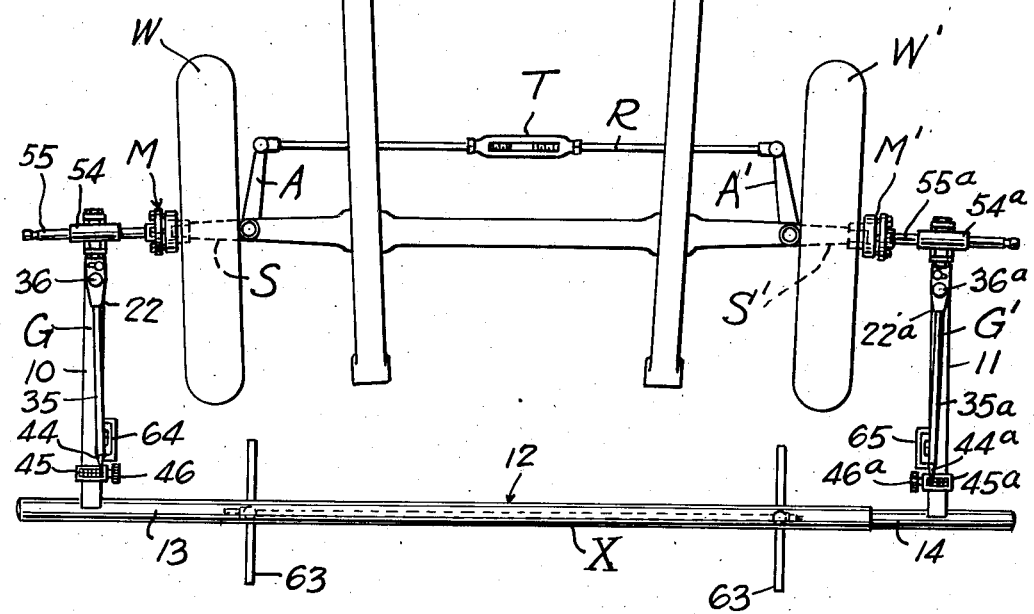
Figure 1 is a plan view of one form of gaging instrument for vehicle wheels embodying this invention, and showing the use of the invention in gaging the toe-in condition of a vehicle's steering wheels.

Referring specifically to the drawings, the invention in its present embodiment comprises a rigid support X in the form of a generally U-shaped metal frame to provide two tubular arms 10 and 11 of square cross section, connected together by a connector member 12 composed of two relatively tightly sliding telescopically associated round tubular sections 13 and 14, to which the respective arms 10 and 11 are permanently and rigidly secured by welding or other means. The connecting member 12 is thus rendered extensible and contractable to vary its length, and hence vary the spacing between the arms 10 and 11.

The support X constitutes means for supporting two gages designated generally at G and G', having suitable indicating means, and being supported by the arms 10 and 11. As the gages are identical in construction except for being right and left hand, the following detailed description of one gage and the manner in which it is supported by the respective arm 10 or 11, will suffice. However, in order to distinguish like parts of the gages from each other, the numerals designating the parts of one gage are provided with exponents.

The gage G comprises an open-ended tubular post 20 (Figures 4 and 5) welded or otherwise rigidly secured to the outer free end of the arm 10. The relatively long portion of the post 20 above the arm 10 is freely received in the hub 21 of an indicating member 22, which hub has its upper end closed by the connecting portion of a yoke 23. A shaft 24 has its upper end portion reduced in diameter at 25 to receive a conical journal 26 which abuts the annular shoulder 27 thus formed on the shaft, and is confined against axial displacement by riveting or otherwise rigidly securing the upper extremity of the shaft at 28 to the connecting portion of the yoke 23 so as to dispose the shaft in the hub 21 in co-axial relation thereto.

The journal 26 seats on a complementarily annular and conical bearing 29 formed on the upper end of the post 20. The lower end of the shaft 24 projects from the lower end of the post 20 to receive a second and oppositely disposed conical journal 30 adapted to be confined on the shaft in engagement with an annular conical bearing 31 on the lower end of the shaft, by means of a service nut 32 and a jam nut 33 screwed onto the threaded portion 34 of the shaft, all to the end of mounting the indicating member 22 for pivotal movement about the fixed axis defined by the post 20.

The indicating member 22 comprises an indicating arm 35 which is pivotally mounted at one end by a stud 36 on a radial extension 37 of the hub 21. The arm 35 is provided with a lug 38 (Figure 5) in which is adjustably mounted a stop screw 39 adapted to be fixed to the lug by a jam nut 40, and engageable with a stop 41 on the extension 37 to pivotally adjust the arm 35 in one direction about the stud 36. The arm 35 is provided with an arcuate slot 42 receiving a lock screw 43 threaded into the extension 37 to clamp the arm to the latter in a selected position of pivotal adjustment.

The other and free end of the arm 35 has a pointer 44 adapted to co-act with a graduated toe-in dial 45 of U-shape in cross section adapted to be rigidly clamped on the arm 10 by a screw 46 (Figures 3 and 6), or to co-act with a turning radius dial 47 adapted to be similarly clamped on the arm 10 by a screw 48 (Figures 8 and 9), according as to which one of the two gaging operations is to be performed.

Threadedly mounted in the arms of the yoke 23 are conical-ended trunnions 50 adapted to be locked to the arms by jam nuts 51, and co-acting with conical, annular bearings 52 in a universal connector 53 to provide a pivotal connection between the latter and the hub 21. The connector 53 also includes a bearing sleeve 54 adapted to be associated with the king pin mounted spindle S of a vehicle wheel W, by means of a gage mounting device M of the type disclosed in United States Letters Patent No. 1,804,490, issued May 12, 1931, or disclosed in our co-pending application Serial No. 681,679, filed July 6, 1946. It will suffice to state for the present application, that the bearing sleeve 54 slidably receives the wheel gage supporting extension or shaft 55 of the mounting device M, and that the shaft is fixed on the spindle S in axial alinement therewith.

Figure 2:
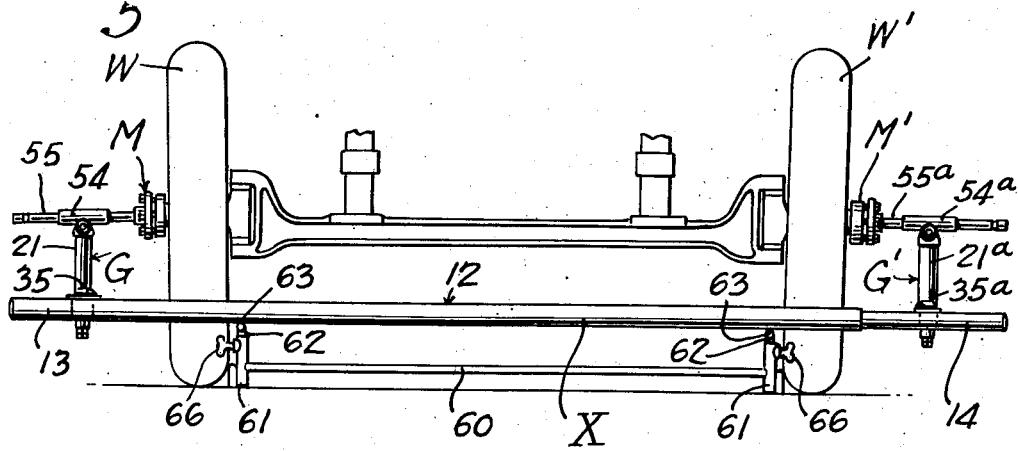
Figure 2 is a view of the gaging instrument for vehicle wheels, in front elevation, and as applied in Figure 1.

Used in conjunction with two of the gage mounting devices designated at M and M', for the respective right and left hand gages G and G', is a stand or rack 60 which includes a pair of tubular standards 61 slidably receiving rods 62 whose upper ends are provided with horizontal bars 63 on which the connecting member 12 rests and is free to slide. The rods 62 are vertically adjustable in the standards 61 to enable the instrument in its applied position to the two king pin mounted wheel spindles S and S' as shown in Figures 1 and 2, to be leveled in accordance with the readings of two spirit levels 64 and 65 secured to the arms 10 and 11, respectively. Clamp screws 66 mounted in the standards 61 are adapted to secure the rods in the final positions of adjustment.

The operation of the invention is as follows:

To determine the toe-in condition of the wheels W and W', the toe-in dials 45 and 45a are applied to the respective arms 10 and 11 of the instrument, and the indicating arms 22 and 22a previously adjusted upon the studs 36 and 36a with the use of the screws 39 and 39a for a fine adjustment in conjunction with a test gage (not shown) on which the bearing sleeves 54 and 54a are temporarily mounted. This initial adjustment is made to dispose the pointers 44 and 44a at the zero graduations of the dials, irrespective of any "out of square" or other inaccurate condition of the gage which may have occurred from improper or careless handling. The screws 43 and 43a are now tightened to lock the arms in the respective adjusted positions.

With the gage mounting devices M and M' applied to the wheel spindles S and S', the sections 13 and 14 of the support X are extended sufficiently for the bearing sleeves 54 and 54a to be slid onto the shafts 55 and 55a of the mounting devices M and M'. The support X is rested on the stand 61, and the latter is adjusted to dispose the instrument absolutely level in accordance with the readings of the spirit levels 64 and 65, in which level position the axes of the trunnions 50 and 50a will be parallel to a horizontal plane.

Should the wheels W and W' have no toe-in or toe-out, the pointers 44 and 44a will remain pointing to the zero graduations of the respective dials 45 and 45a. Due to the pivotal connection between the support X and the bearing sleeves 54 and 54a, provided by the trunnions 50 and 50a, respectively, the wheels W and W' are rendered free for their steering movements, and the spindles S and S' will be free to occupy their relative positions based on the mechanical connection between the wheels formed by the conventional steering arms A, A' and the tie rod R.

However, should any toe-in or toe-out be present, this condition will be indicated upon moving the wheels to a position wherein either the pointer 44 or 44a is pointing to the zero graduation of the respective dial 45 or 45a, thus causing the other pointer, through the action of the rigid support X, to indicate on the other dial the amount of toe-in or toe-out. The tie rod R, which is provided with suitable means such as a turnbuckle T to render its length variable, is now adjusted until one of the pointers indicates the desired amount of toe-in when the other pointer co-incides with the zero graduation of its respective dial. By the provision of the rigid support X carrying the dials 45 and 45a, and the freedom of movement of the wheel spindles S and S' with the indicating arms 22 and 22a relative to the support about the axes of the trunnions 50 and 50a, the positions of the pointers 44 and 44a with respect to the dials will be accurately determined by the actual angular relationship of the longitudinal axes of the wheel spindles to each other, so that an absolutely accurate indication of the toed condition present will be indicated by the gages.

Furthermore, with the toe-in of the wheels equalized between the wheels by moving the latter until the pointers 44 and 44a both give the same indication on the respective dial, so that a squared condition of the axle is effected by the instrument, the latter renders it possible to detect various forms of misalinement of the vehicle's chassis. For example, and with the toe-in of the wheels indicated by the instrument as being equalized between the wheels, measurements with a suitable measuring tape between corresponding points on the front and rear wheels on both sides of the vehicle will be equal, providing the front and rear axles and the frame of the vehicle are in proper alinement, whereas such measurements will be different should the front or rear axle be further back on one side of the frame than on the other, or the axles or a horn of the frame be bent.

Should the frame be out of square and the front and rear wheels be in proper alinement and thus be parallel so that such measurements on both sides of the vehicle will be equal, this condition of the frame can be detected by sighting along the front and rear wheels on one side of the vehicle and making a comparison with a corresponding sighting along the front and rear wheels on the other side of the vehicle.

In the use of the gaging instrument for determining turning radius or the relative turning movements of the wheels in executing a right or left turn from a straight-ahead position as is controlled by the lengths of, and the angular relationship between the steering arms A and A', the dials 45 and 45a are removed from the arms 10 and 11, and the other dials 47 and 47a (Figures 8 and 9) substituted therefor. These dials are precalculated to indicate at opposite sides of the zero graduation thereon, the proper relative movement of the wheels necessary for both wheels to travel without side friction over the ground in executing turns, during which the inside wheel must travel on a shorter radius than does the outside wheel. Therefore, unless the wheels are caused by the steering arms A and A' to turn predetermined proportional amounts, side friction will result and will cause unnecessary tire wear as well as render the vehicle difficult to control.

With the wheels occupying a straight-ahead position, the indicating arms 22 and 22a are now adjusted about the studs 36 and 36a and are locked by the screws 43 and 43a in positions wherein the pointers 44 and 44a coincide with the zero graduations of the respective dials 47 and 47a, as shown in Figure 9.

Should relative turning movements of the wheels be correct, steering movement of the wheels to execute a right or left turn will cause the pointers 44 and 44a to travel across the same number of graduations on the respective dials from the starting position at the zero graduations. Should this not be the case, one pointer will travel across more or less graduations than will the other pointer, so as to indicate that the steering arm A or A' is bent and in what direction.

The universal connectors 53 and 53a compensate for any camber and/or caster in the wheels which would otherwise render the toe-in and turning radius gaging operations inaccurate. The manner in which the support X is associated with the gage mounting devices M and M' through the medium of the posts 20, 20a and the hubs 21, 21a of the indicating members 22, 22a, enables the instrument to be readily applied to the most modern type of automobile without interference by the low fender and radiator grille constructions now used, as well as simplifies and strengthens the instrument structurally so that it will not become deformed or rendered inaccurate under the most severe operating conditions.

When the turning radius operation is completed, the indicating members 22 and 22a are adjusted to their originally tested positions against the respective stops 41 and 41a, to restore the instrument to its position for the next toe-in gaging operation on another vehicle.

Although the term "axle" has been used in connection with the wheel spindles, this expression is to be broadly construed in the specification and claims as including the present front end suspension or independent springing of the wheels from the chassis frame. Also, the term "spindles" is to be similarly broadly construed to include the live axles of the rear or driving wheels, as the instrument may be identically supported from such axles in testing for a bent condition of the axle housing.

We claim:

1. A gaging instrument of the class described comprising: a support having spaced arms provided with posts; means adapted to suspend said posts about axes co-axially related to the axes of the steering spindles of an axle and with the longitudinal axes of the posts in intersecting relation to the spindles' axes for turning movement of the support relative to the spindles upon steering movements of the latter; two indicating devices, each having two coacting parts; means mounting one part of each indicating device on each arm of the support for turning movement with the latter; and means mounting the other part of each indicating device on each of said posts for relative movement with respect to said one of the parts of the respective device when steering movement of the spindles is effected.

2. A gaging instrument of the class described comprising: a support having spaced arms provided with posts; means for mounting said posts about axes co-axially related to the axes of the king pin mounted steering spindles of an axle, for turning movement of the support relative to the spindles in accordance with steering movements of the latter; two indicating devices, each including a dial carried by one of said arms and a co-acting indicating arm having a hub rotatably mounted on the respective post; and means for operatively connecting said hubs to the respective steering spindles to move therewith in response to steering movements of the spindles, whereby said indicating arms will co-act with the respective dials to indicate on the latter the angles through which the steering spindles move.

3. A gaging instrument of the class described comprising: a support having spaced arms provided with posts; two indicating devices, each including a dial carried by one of said arms, and a co-acting indicating arm having a hub rotatably mounted on the respective post; connectors, one for each hub and pivotally connected thereto about an axis in right angular relation to the hub axis; said connectors having bearing members adapted to suspend the hubs from the steering spindles of an axle; and means adapted to mount the support from the spindles, for turning movement of the support in response to steering movement of the spindles.

4. A gaging instrument of the class described comprising: a support having spaced arms provided with posts; two indicating devices, each including a dial carried by one of the arms, and a co-acting indicating arm having a hub freely receiving the post of the respective support arm; shafts fixed to the hubs and journaled in the respective posts; and connectors pivotally mounted on the hubs and including bearing sleeves adapted to be mounted on co-axial extensions of the steering spindles of an axle to mount the instrument on the spindles.

5. A gaging instrument of the class described comprising: a support having spaced arms provided with posts; two indicating devices, each including a dial carried by one of the arms, and a co-acting indicating arm having a hub freely receiving the post of the respective support arm; shafts fixed to the hubs and journaled in the respective posts; yokes on the hubs having trunnions; and connectors mounted on said trunnions for pivotal movement about one axis; said connectors having bearing sleeves at right angles to the axes of said trunnions and adapted to be pivotally mounted on co-axial extensions of the steering spindles of an axle to mount the instrument on the spindles.

6. A gaging instrument as embodied in claim 2 wherein said indicating arms are pivotally mounted on the respective hubs for adjustment parallel to the plane of movement of the indicating arms, for adjustment of the latter to predetermined starting positions with respect to the respective dials; and means for releasably retaining the indicating arms in adjusted positions.

7. A gaging instrument as embodied in claim 2 wherein said indicating arms are pivotally mounted on the respective hubs for adjustment parallel to the plane of the movement of the indicating arms, for adjustment of the latter to predetermined starting positions with respect to the respective dials; means for releasably retaining the indicating arms in adjusted positions; and limit stops and adjustable stop members on said hubs and arms co-acting to facilitate setting of the indicating arms at predetermined positions with respect to their dials.

8. A gaging instrument of the class described comprising: a support composed of a connecting member having laterally projecting spaced arms; posts rigidly secured to the arms to project upwardly therefrom; two indicating devices, each including a dial carried by one of said arms and a co-acting indicating arm; means rotatably mounting said indicating arms on the respective posts for indicating co-action with the respective dials; and means adapted to mount the last means for movement about axes co-axially related to the axes of the steering spindles of a vehicle axle, with the support and indicating devices suspended at a level lower than the body structure of the vehicle so as to leave the support free for turning movement in response to steering movements of the spindles.

WALTER BAGGE.
GEORGE F. BAGGE.

REFERENCES CITED

The following references are of record in the file of this patent:

UNITED STATES PATENTS

| Number | Name | Date |
|---|---|---|
| 1,641,243 | Wochner | Sept. 6, 1927 |
| 1,922,344 | Bagge | Aug. 15, 1933 |
| 2,164,853 | Beckwith | July 4, 1939 |

FOREIGN PATENTS

| Number | Country | Date |
|---|---|---|
| 84,929 | Switzerland | May 1, 1920 |